(12) United States Patent
Flynn

(10) Patent No.: US 7,600,141 B2
(45) Date of Patent: Oct. 6, 2009

(54) DATA PROCESSING PERFORMANCE CONTROL

(75) Inventor: David Walter Flynn, Cambridge (GB)

(73) Assignee: ARM Limited, Cambridge (GB)

( * ) Notice: Subject to any disclaimer, the term of this patent is extended or adjusted under 35 U.S.C. 154(b) by 934 days.

(21) Appl. No.: 10/715,368

(22) Filed: Nov. 19, 2003

(65) Prior Publication Data

US 2004/0199799 A1 Oct. 7, 2004

(30) Foreign Application Priority Data

| Jan. 13, 2003 | (GB) | ................. | 0300710.1 |
| Jan. 13, 2003 | (GB) | ................. | 0300712.7 |
| Jan. 13, 2003 | (GB) | ................. | 0300713.5 |
| Jan. 27, 2003 | (GB) | ................. | 0301852.0 |

(51) Int. Cl.
*G06F 1/04* (2006.01)
*G06F 11/30* (2006.01)

(52) U.S. Cl. ............. 713/322; 713/500; 713/502; 714/47; 702/182

(58) Field of Classification Search ........ 713/500, 713/502, 322; 714/47; 702/182
See application file for complete search history.

(56) References Cited

U.S. PATENT DOCUMENTS

| 5,179,693 | A |   | 1/1993 | Kitamura et al. |
| 5,627,412 | A |   | 5/1997 | Beard |
| 5,655,127 | A |   | 8/1997 | Rabe et al. |
| 5,692,201 | A |   | 11/1997 | Yato |
| 5,812,860 | A |   | 9/1998 | Horden et al. |
| 6,016,548 | A |   | 1/2000 | Nakamura et al. |
| 6,065,122 | A |   | 5/2000 | Wunderlich et al. |
| 6,073,244 | A |   | 6/2000 | Iwazaki |
| 6,148,415 | A | * | 11/2000 | Kobayashi et al. ............ 714/15 |
| 6,173,409 | B1 |   | 1/2001 | Watts, Jr. et al. |
| 6,182,232 | B1 |   | 1/2001 | Klein |
| 6,275,948 | B1 |   | 8/2001 | Bays et al. |
| 6,519,707 | B2 | * | 2/2003 | Clark et al. ................. 713/322 |
| 6,801,760 | B2 | * | 10/2004 | Hutchison et al. ......... 455/127.3 |
| 6,823,516 | B1 | * | 11/2004 | Cooper ....................... 718/108 |
| 7,254,721 | B1 | * | 8/2007 | Tobias et al. ................ 713/300 |
| 2002/0140467 | A1 |   | 10/2002 | Naffziger et al. |
| 2004/0028070 | A1 | * | 2/2004 | Barr et al. .................... 370/431 |

FOREIGN PATENT DOCUMENTS

EP 0 632 360 1/1995

(Continued)

OTHER PUBLICATIONS

The Technology Behind Crusoe Processors, by Alexander Klaiber, Transmeta Corporation, Jan. 2000, pp. 1-17.

(Continued)

*Primary Examiner*—Thomas Lee
*Assistant Examiner*—Michael J Brown
(74) *Attorney, Agent, or Firm*—Nixon & Vanderhye P.C.

(57) ABSTRACT

A data processing system is provided having a processor 46 which generates control signals for controlling further circuits, such as a clock generator 4 and voltage controller 6, to operate so as to support a desired performance level of the processor. Whilst changing between performance levels, the further circuits are capable of supporting intermediate levels of operation and the processor exploits these by operating at those intermediate levels pending the final target level being reached.

8 Claims, 10 Drawing Sheets

FOREIGN PATENT DOCUMENTS

| | | |
|---|---|---|
| JP | 2001-265666 | 9/2001 |
| JP | 2002-304232 | 10/2002 |
| TW | 201830 | 3/1993 |
| TW | 342480 | 10/1998 |
| WO | WO 98/44405 | 10/1998 |
| WO | WO 01/53921 | 7/2001 |

OTHER PUBLICATIONS

Longrun Power Management, by Marc Fleischmann, Transmeta Corporation, Jan. 17, 2001, pp. 1-17.

Israeli Office Action dated Apr. 20, 2009 and English translation.

* cited by examiner

| Desired performance 6-bit | Control signal value | |
|---|---|---|
| 0 | 00000000 | Idle |
| 1-4 | 00000001 | |
| 5-8 | 00000011 | |
| 9-12 | 00000111 | |
| 13-16 | 00001111 | |
| 17-20 | 00011111 | |
| 21-24 | 00111111 | |
| 25-28 | 01111111 | |
| 29-32 | 11111111 | |

Example mapping

CPU clock generator

| Perf/32 | Binary | Fractional | % | Coding | Note |
|---|---|---|---|---|---|
| 32 | 1.00000 | 1.00000 | 100.0% | 11111111111111111111111111111111 | MAX |
| 31 | 0.11111 | 0.96875 | 96.9% | 01111111111111111111111111111111 | |
| 30 | 0.11110 | 0.93750 | 93.8% | 00111111111111111111111111111111 | |
| 29 | 0.11101 | 0.90625 | 90.6% | 00011111111111111111111111111111 | |
| 28 | 0.11100 | 0.87500 | 87.5% | 00001111111111111111111111111111 | |
| 27 | 0.11011 | 0.84375 | 84.4% | 00000111111111111111111111111111 | |
| 26 | 0.11010 | 0.81250 | 81.3% | 00000011111111111111111111111111 | |
| 25 | 0.11001 | 0.78125 | 78.1% | 00000001111111111111111111111111 | |
| 24 | 0.11000 | 0.75000 | 75.0% | 00000000111111111111111111111111 | |
| 23 | 0.10111 | 0.71875 | 71.9% | 00000000011111111111111111111111 | |
| 22 | 0.10110 | 0.68750 | 68.8% | 00000000001111111111111111111111 | |
| 21 | 0.10101 | 0.65625 | 65.6% | 00000000000111111111111111111111 | |
| 20 | 0.10100 | 0.62500 | 62.5% | 00000000000011111111111111111111 | |
| 19 | 0.10011 | 0.59375 | 59.4% | 00000000000001111111111111111111 | |
| 18 | 0.10010 | 0.56250 | 56.3% | 00000000000000111111111111111111 | |
| 17 | 0.10001 | 0.53125 | 53.1% | 00000000000000011111111111111111 | |
| 16 | 0.10000 | 0.50000 | 50.0% | 00000000000000001111111111111111 | |
| 15 | 0.01111 | 0.46875 | 46.9% | 00000000000000000111111111111111 | |
| 14 | 0.01110 | 0.43750 | 43.8% | 00000000000000000011111111111111 | |
| 13 | 0.01101 | 0.40625 | 40.6% | 00000000000000000001111111111111 | |
| 12 | 0.01100 | 0.37500 | 37.5% | 00000000000000000000111111111111 | |
| 11 | 0.01011 | 0.34375 | 34.4% | 00000000000000000000011111111111 | |
| 10 | 0.01010 | 0.31250 | 31.3% | 00000000000000000000001111111111 | |
| 9 | 0.01001 | 0.28125 | 28.1% | 00000000000000000000000111111111 | |
| 8 | 0.01000 | 0.25000 | 25.0% | 00000000000000000000000011111111 | |
| 7 | 0.00111 | 0.21875 | 21.9% | 00000000000000000000000001111111 | |
| 6 | 0.00110 | 0.18750 | 18.8% | 00000000000000000000000000111111 | |
| 5 | 0.00101 | 0.15625 | 15.6% | 00000000000000000000000000011111 | |
| 4 | 0.00100 | 0.12500 | 12.5% | 00000000000000000000000000001111 | |
| 3 | 0.00011 | 0.09375 | 9.4% | 00000000000000000000000000000111 | |
| 2 | 0.00010 | 0.06250 | 6.3% | 00000000000000000000000000000011 | |
| 1 | 0.00001 | 0.03125 | 3.1% | 00000000000000000000000000000001 | |
| 0 | 0.00000 | 0.00000 | 0.0% | 00000000000000000000000000000000 | IDLE |

FIG. 7

DATA PROCESSING PERFORMANCE CONTROL

BACKGROUND OF THE INVENTION

1. Field of the Invention

This invention relates to the field of data processing systems. More particularly, this invention relates to the field of the control of data processing performance, such as, for example, so as to reduce the energy consumed by a data processing system.

2. Description of the Prior Art

An important consideration in data processing systems is their energy consumption. Data processing systems which consume less energy allow longer battery life in mobile devices, tend to run cooler and more reliably, and require fewer special engineering considerations to deal with heat dissipation and the like. It is strongly desirable to reduce the energy consumption of data processing systems.

Balanced against a desire to reduce the energy consumption of data processing systems is a simultaneous desire to increase their performance level to deal with increasingly computationally intensive tasks. Such tasks often require highly intensive processing operations for short periods of time followed by relatively long idle times in which little computation is required.

In order to address the above two factors, it is known to produce data processing systems that are able to change their performance level so that high computational performance is provided in some configurations and low energy consumptions in other configurations. Known systems, such as the LongRun software produced by Transmeta, or the SpeedStep systems produced by Intel, allow a processor to be switched between such different configurations. In order to match the desired performance goals, a high computational performance configuration would be one with a relatively high operating voltage and a relatively high processor clock frequency. Conversely, a low energy consumption configuration has a relatively low operating voltage and a relatively low processor clock frequency.

As well as providing the performance and energy management capabilities described above, another important design characteristic is that hardware and software designs should be re-useable in a relatively large number of different circumstances. If computer software, such as operating system software, has to be re-written for different hardware implementations, or the hardware designs significantly modified for different hardware implementations, then this is strongly disadvantageous.

SUMMARY OF THE INVENTION

According to one aspect the present invention provides apparatus for processing data, said apparatus comprising:

a processor operable to perform data processing operations, said processor being operable to generate a performance control signal indicative of a desired data processing performance level of said processor; and at least one further circuit responsive to said performance control signal to operate so as to support said desired data processing performance level of said processor; wherein while responding to a change in performance control signal corresponding to a change from a first desired data processing performance level to a second desired data processing performance level, said at least one further circuit is operable to support data processing at at least one intermediate data processing performance level and said processor temporarily operates at said at least one intermediate data processing performance level during said change.

The present technique provides a system in which whilst responding to a change in performance control signal the further circuits are operable to support at least one intermediate data processing performance level and the processor takes advantage of this to operate at the at least one intermediate data processing performance level during the change. The performance change being made could be an increase in performance level with higher intermediate performance levels being adopted as soon as they are available so as to make the best forward progress in executing the code concerned. Alternatively, during a decrease in performance level the technique results in lower intermediate performance levels being adopted as soon as they are available so as to reduce energy consumption more rapidly.

In the case of an increase in performance level it may be that the requirement for increased performance level is removed before that increased performance level is reached. As an example, servicing a high priority but relatively computationally unintensive, interrupt may trigger an attempted switch to a maximum performance level but in fact the interrupt code is completely executed in only a few processing cycles and long before the processing level has ramped up to maximum, the use of the intermediate processing levels enabling this interrupt servicing more rapidly. When the need for the higher processing level is removed, a new desired data processing performance level is set cancelling the switch to the maximum performance level.

Whilst the current technique is applicable in the control of a wide variety of different types of further circuit, it is particularly useful when controlling clock generators and voltage controllers. In such circumstances, a switch to a higher clock frequency so as to make best forward progress through the program code concerned can be made as soon as that higher frequency is available and the supply voltage is sufficient to support that increased speed operation even though this might only be an intermediate frequency on the way to the desired final target frequency.

Preferred embodiments of the invention also provide a priority signal which is able to trigger a change to a predetermined performance level irrespective of control signal values (e.g. a maximum or reduced level). This allows hardware mechanisms to directly control performance level in a manner which can facilitate rapid response to circumstances such as hardware interrupts, reduced battery power signals and the like.

Viewed from another aspect the present invention provides a method of processing data, said method comprising the steps of:

performing data processing operations with a processor, said processor being operable to generate a performance control signal indicative of a desired data processing performance level of said processor; and in response to said performance control signal, operating one or more further circuits so as to support said desired data processing performance level of said processor; wherein while responding to a change in performance control signal corresponding to a change from a first desired data processing performance level to a second desired data processing performance level, said one or more further circuits are operable to support data processing at at least one intermediate data processing performance level and said processor temporarily operates at said at least one intermediate data processing performance level during said change.

The above, and other objects, features and advantages of this invention will be apparent from the following detailed description of illustrative embodiments which is to be read in connection with the accompanying drawings.

BRIEF DESCRIPTION OF THE DRAWINGS

FIG. 7 is a diagram schematically illustrating a further example of a mapping between a desired performance level and a control signal value;

DESCRIPTION OF THE PREFERRED EMBODIMENTS

Figure 1:
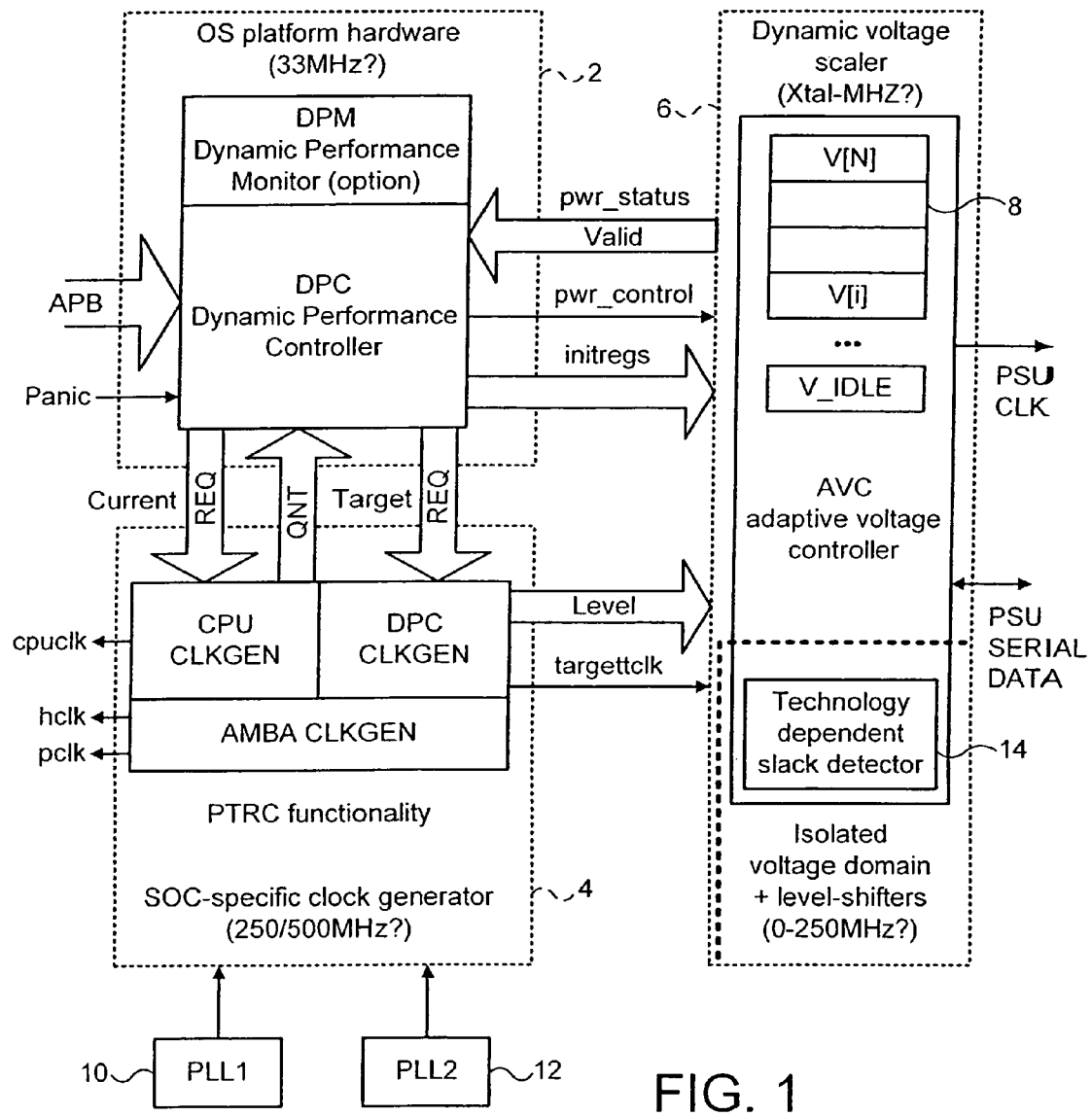
FIG. 1 schematically illustrates a portion of a data processing system including a performance controller, a clock generator and a voltage controller.

FIG. 1 illustrates a portion of a data processing system including a performance controller 2, a clock generator 4 and a voltage controller 6. The circuits in FIG. 1 typically form part of a larger integrated circuit which includes a processor, such as an ARM processor produced by ARM Limited of Cambridge, England, as well as other circuit elements, possibly as part of a system-on-chip design. The circuit elements other than the performance controller 2, the clock generator 4 and the voltage controller 6 are omitted from FIG. 1 for the sake of simplicity. The performance controller 2 receives a performance level request signal/value which is generated under program instruction control by a computer program, such as an operating computer program, executing upon the processor (not illustrated). This desired data processing performance level request may be written to a dedicated memory location within the memory address space for such a purpose, may be written to a control register, such as a control register within a configuration coprocessor, e.g. CP15 ARM architecture or stored in some other way. The performance controller 2 also incorporates a performance monitor, which may be one or more performance counters counting the passage of real time, clock signals, work performed or other performance monitoring parameters. When the performance controller 2 receives a data processing performance level request indicative of a change in the desired performance level, then it is used issue a request for the new target clock speed to the clock generator 4 and a request for a new target voltage to the voltage controller 6. It will be appreciated that once the program instruction has written its desired data processing performance level to the appropriate location it hands control of how that is put into effect to the hardware (performance controller 2). The performance controller 2 maps the desired data processing performance request to appropriate control signal values for the clock generator 4 and voltage controller 6 (the performance controller 2 includes a mapping circuit). The data processing performance request signal may be a Gray coded signal value or a simple linearly coded value. The mapping can be to a thermometer coded control signal value as this provides good resistance against sampling errors when sampling between clock domains which may be asynchronous. Furthermore, this provides a type of fail-safe behaviour whereby sampling errors tend to produce the lowest stable synchronised value for use.

The control signal passed to the voltage controller 6 instructs the voltage controller 6 to adopt a new voltage output level. The voltage output levels that are supported may be configured by programming configuration parameter registers 8 within the voltage controller 6 at bootup or some other time. The voltage controller 6 takes a finite amount of time to ramp up or down to the new voltage level. In some embodiments, as it is changing to its new voltage level, the voltage controller 6 may pass through one or more intermediate levels which it would be capable of supporting an intermediate performance level pending reaching the final performance level (in other embodiments described later, a single operating frequency clock signal and a stopped clock may be used). The voltage controller 6 generates current operation signals indicative of the current voltage levels it can support and passes these back to the performance controller 2 where they may be acted upon to trigger use of associated clock frequencies as appropriate and available.

The performance controller 2 also converts the desired data processing performance level specified by program control into control signals that are passed to the clock generator 4. These control signals specify a target clock frequency. The clock generator 4 is supplied with a variety of clock signals from one or more phase lock loop circuits 10, 12. One of these phase lock loop circuits 10 is permanently enabled and serves to provide the minimum and maximum clock frequencies supportable as well as some intermediate frequencies. Another of the phase lock loop circuits 12 is selectively available and can be powered down to save energy when the intermediate clock frequencies which it generates are not required.

The clock generator 4 generates a performance controller clock signal which is supplied to a technology dependent slack detector 14 within the voltage controller 6. This arrangement can be used to provide an additional level of control within the voltage controller 6 such that the voltage it is generating can be adjusted to support the target clock frequency with a reduced overshoot, i.e. the voltage level generated is just sufficient, with a small buffer, to support the target clock frequency. This fine level of control of the voltage output can be considered to be secondary to the gross performance level changes conducted in response to changes in desired data processing performance levels specified by program instructions. When a change to an increased performance level has been indicated, the voltage controller 6 will attempt to increase the voltage it is generating and when it is providing an increased voltage this is indicated back to the performance controller 2 which in turn can then control the CPU clock generator within the clock generator 4 to output a CPU clock signal cpuclk for supply to the processor having a new clock frequency sustainable with the new voltage, which may be an intermediate clock frequency on the way to the ultimate desired clock frequency. The clock generator 4 may not be capable of generating clock signals with the granularity that can be specified in the control signal values and accordingly passes back a quantised clock signal value corresponding to the actual clock frequency it is generating. Alternatively, this quantisation taking account of the actual capabilities of the clock generator 4 can take place within the mapping performed by the performance controller from the desired data processing performance request into the control signals. In another embodiment discussed later, the voltage controller has two possible voltage output levels, a high level for use in a processing mode and a low level for use in a holding mode when the clock is stopped.

Figures 2, 3:
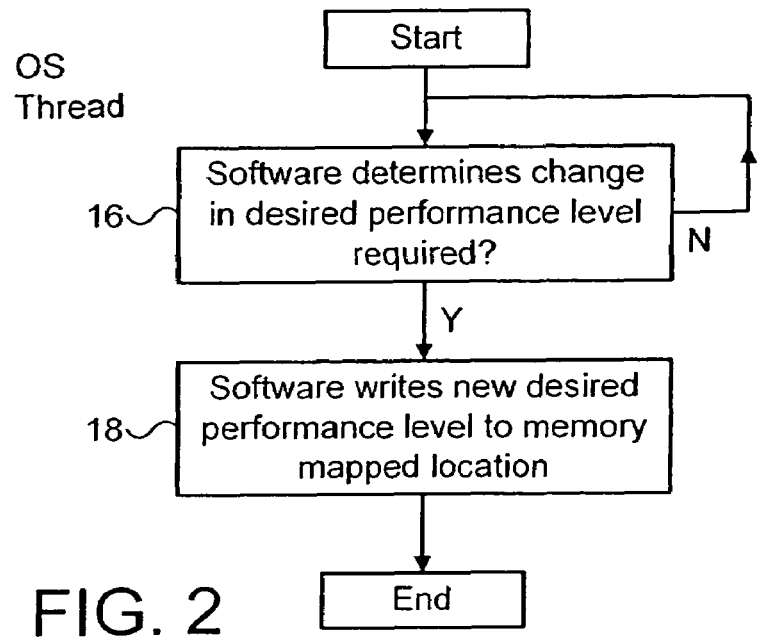
FIG. 2 is a flow diagram schematically illustrating the operation of an operating system computer program in setting a desired performance level.
FIG. 3 schematically illustrates an example mapping between desired performance level and control signal value.

FIG. 2 schematically illustrates the processing operations which may be performed by an operating system computer program executing on a processor in accordance with one example of the technique. At step 16, the relevant processing thread waits until a determination is made of a need to change performance level. This need may be indicated by changes in external parameters, such as key presses by a user, or may be internally triggered through monitoring of the operational performance of the system using performance monitoring counters such as those previously discussed. When such a desired performance level change is detected, processing proceeds to step 18 at which the software performs a write to a memory mapped location dedicated to storing the desired data processing performance request level. The action of the computer program code is to detect the requirement for a change in performance level and to write this requirement to a memory location. No control feedback need be provided to monitor that the desired change in performance actually takes place or how it takes place. There is an abstraction between the activity of the computer program in making this write and the underlying hardware mechanisms which act upon the request. This facilitates the use of substantially unaltered computer programs in a variety of environments taking advantage of whatever performance management mechanisms may or may not be provided within those environments.

FIG. 3 schematically illustrates an example mapping between a 6-bit desired data processing performance request signal (which may optionally be Gray coded) and a corresponding thermometer coded control signal value. In this case whilst there are 33 possible performance levels, there are only 9 possible control signal values. Accordingly, there is a quantisation between the desired performance levels and control signal values. This quantisation is arranged such that the control signal value corresponds to the maximum performance level within a range of performance levels which may be mapped to that control signal value. There is a monotonic increase in the desired performance signal and the performance level this is intended to specify. Thus, the desired performance level can be a binary fraction representing a percentage of the maximum performance level that may be achievable in the system. This is a convenient and flexible way to abstract the performance level request in a manner which it can be controlled by program instructions in a wide variety of different hardware environments and for a wide variety of different processing purposes.

Figure 4:
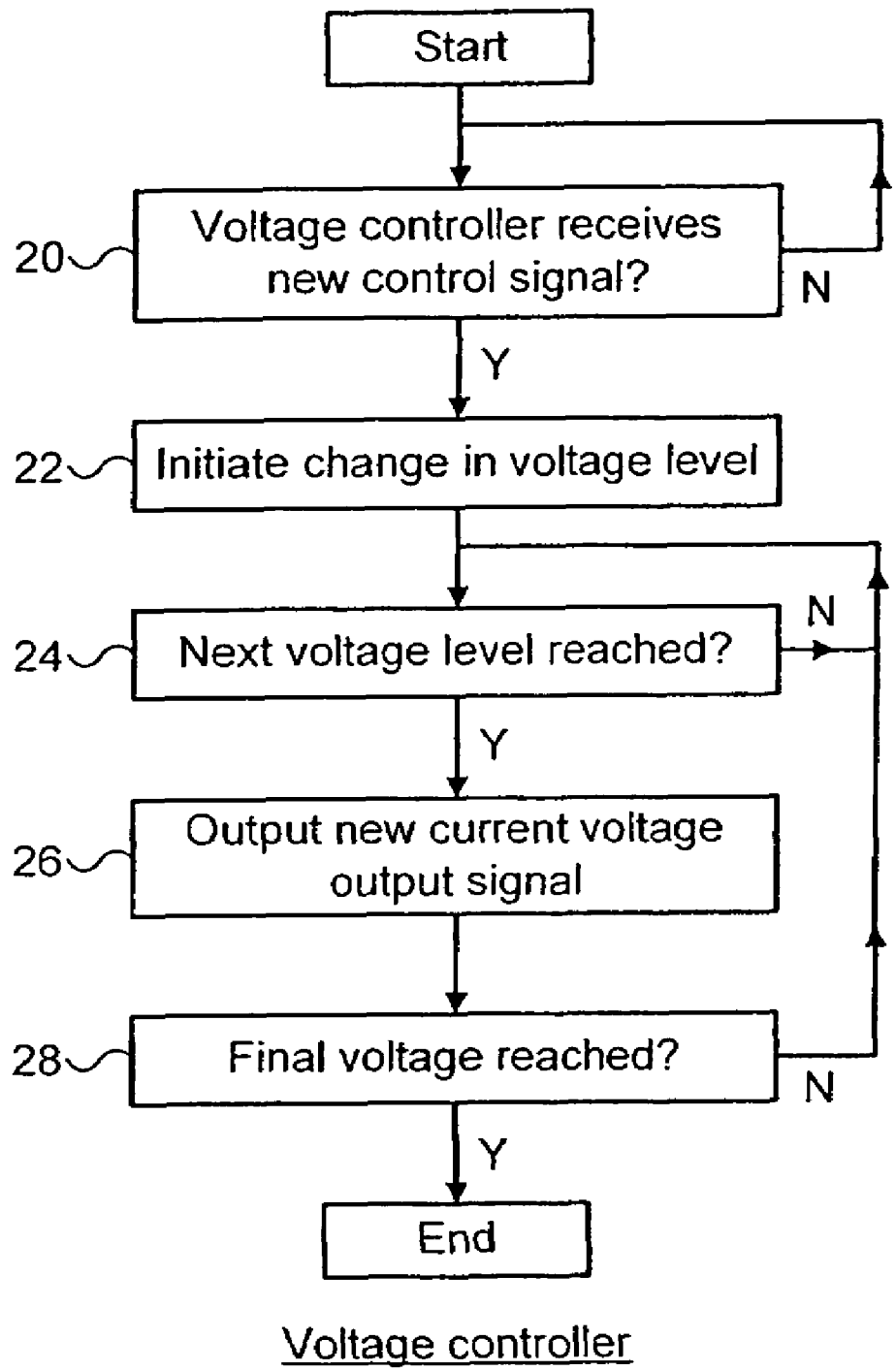
FIG. 4 is a flow diagram schematically illustrating the control of a voltage controller.

FIG. 4 schematically illustrates control of the voltage controller 6 in embodiments having multiple voltage levels corresponding to active processing modes in which the clock is running. At step 20 the voltage controller waits for receipt of a new control signal. When a new control signal is received, processing proceeds to step 22 at which a change in the voltage level supplied is initiated. This change may be an increase or a decrease. The voltage controller 6 has a finite slew rate at which it can change its output. Step 24 monitors until the next sustainable voltage level is reached during the overall change which is occurring. When such a next level is reached, then step 26 is initiated and a new current voltage output signal is generated for supply back to the performance controller 2 to indicate the new voltage level which the voltage controller 6 is capable of supporting. This may be an intermediate voltage level on the way to the eventual target voltage level, or at the end of the slew is the final target voltage level itself. The performance controller 2 can act upon this current voltage output signal fed back to it to control the clock generator and possibly the performance monitoring circuits. Step 28 determines whether the final voltage has yet been reached. If the final voltage has not yet been reached, then processing is returned to step 24 and slewing of the voltage output continues towards its eventual target. In a system supporting only two voltage levels the system would simply wait for the final voltage level to be reached without the intermediate voltage levels.

It will be appreciated that FIG. 4 assumes that the control signal does not change. In practice, the control signal may change before the final target voltage is reached. It may be that the need for a temporary change in performance level as determined by the program instructions within the operating system has gone away, such as an interrupt having been serviced or a panic mode signal having been de-asserted. In such circumstances, the control illustrated in FIG. 4 is interrupted and processing returned to step 20 where action based upon the newly established control signal value is initiated. It will be appreciated that the control by the software is at least partially open loop in that it merely specifies which performance level it desires at a particular point in time but does not require monitoring of what performance is actually delivered or when the performance level is actually delivered.

As mentioned, a panic signal (priority signal or hardware override signal) may be supplied to the performance controller 2 to override any software control of the performance level and temporarily increase the performance level to a maximum level. Bypassing of the software control of performance level can facilitate more rapid and direct switching to maximum performance levels under purely hardware control, such as in response to specific high priority hardware interrupt signals. More than one such "panic" signal may be provided, e.g. a "Low-Battery-Panic" signal might force performance to a known reduced level.

Figure 5:
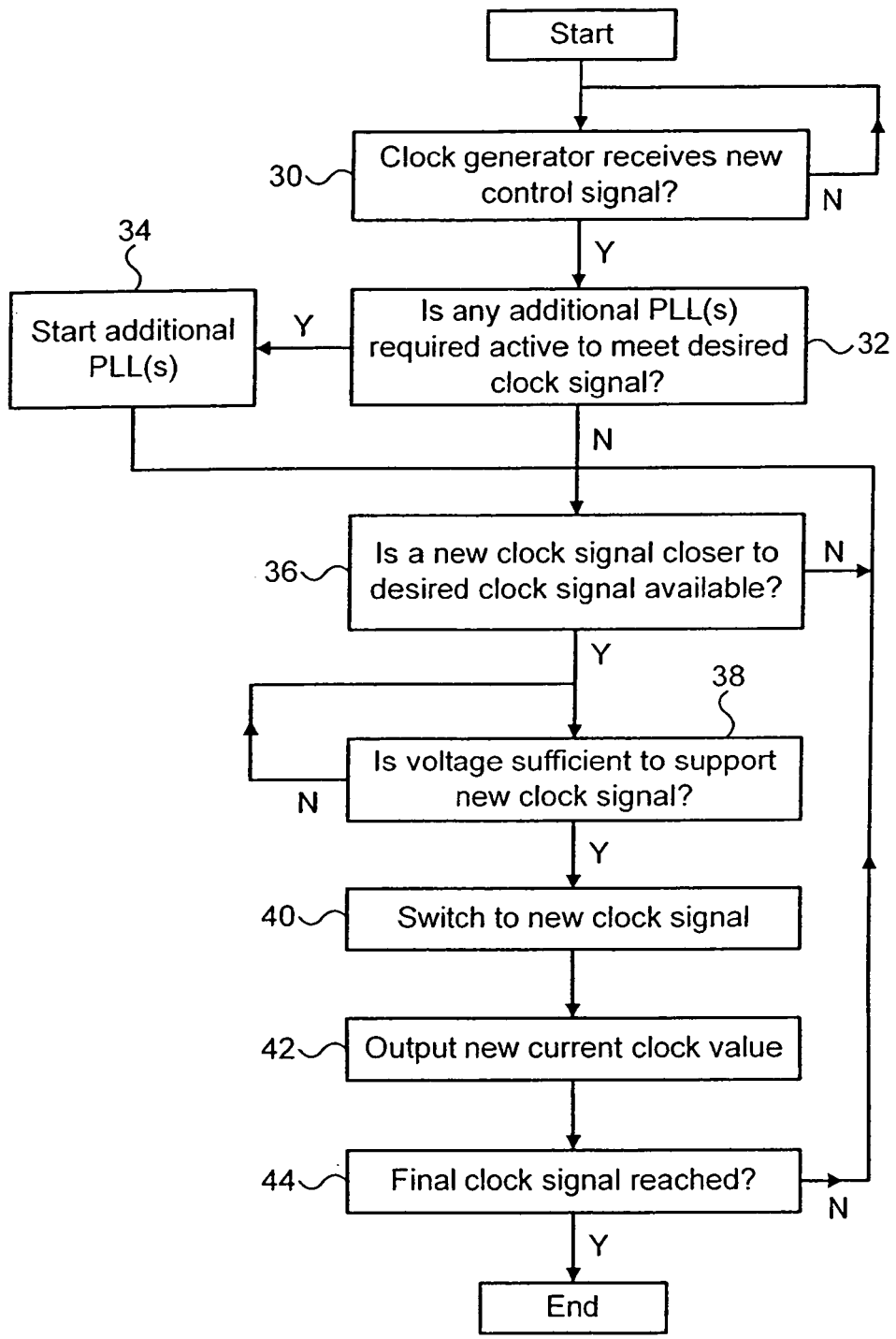
FIG. 5 is a flow diagram schematically illustrating the control of a clock generator.

FIG. 5 schematically illustrates the control of the clock generator 4. At step 30 the clock generator waits to receive a new control signal. When a new control signal is received, processing proceeds to step 32 at which a determination is made as to whether or not any additional phase lock loop circuit 12 needs to be powered up to service the ultimately required new clock frequency. If such additional phase lock loop circuits 12 are required, then processing proceeds to step 34 where they are started. Alternatively, processing proceeds directly to step 36.

At step 36 the clock generator determines whether a new clock signal closer to the requested performance level is available. This facilitates the adoption of intermediate performance levels pending the availability of the eventual target performance level. When such an intermediate clock frequency is identified, then processing proceeds to step 38. Step 38 determines whether or not the current operation signal value fed back from the voltage controller 6 indicates that a voltage is being generated that is capable of sustaining the new clock signal value. When such a voltage is available, then processing proceeds to step 40 at which the new clock signal value is adopted and generated by the CPU clock generator as signal cpuclk which is supplied to the processor core. Step 42 then outputs a new current clock value back to the performance controller 2 where it may be acted upon by the performance monitoring hardware to assess the forward progress through the code. Step 44 determines whether or not the switch to the new clock frequency has been the switch to the final clock frequency which was specified by the program instruction generated desired data processing performance request. If the final target clock frequency has not been reached, then processing returns to step 36, otherwise the control terminates, (effectively returns to step 30).

As for FIG. 4, FIG. 5 also assumes that the desired data processing performance level specified by the program instructions does not change. If this does change, then a new mapped control signal value will be generated which interrupts the processing illustrated in FIG. 5 and returns the processing to step 30 whereupon the new control signal value is acted upon.

The adoption of intermediate clock frequency values whilst changing between an initial and a final clock frequency value allows the best forward progress through the code to be achieved for the particular state of the circuits concerned. The circuits do not stay operating at the initial clock frequency until the eventual target clock frequency becomes available, but instead ramp up or down through a sequence of clock frequencies as each becomes available during the performance slew. The adoption of a new clock frequency can be considered to be controlled by a logical AND of a signal indicating that the frequency is closer to the target frequency than the current frequency, a signal indicating the availability of that frequency from a clock source together with a signal indicating that the voltage controller is capable of producing a power signal having a voltage sufficient to sustain operation at that new clock frequency. Alternatively, in other embodiments having only two performance levels (MAX/IDLE), the system would wait for the final voltage before making the switch.

Figure 6:
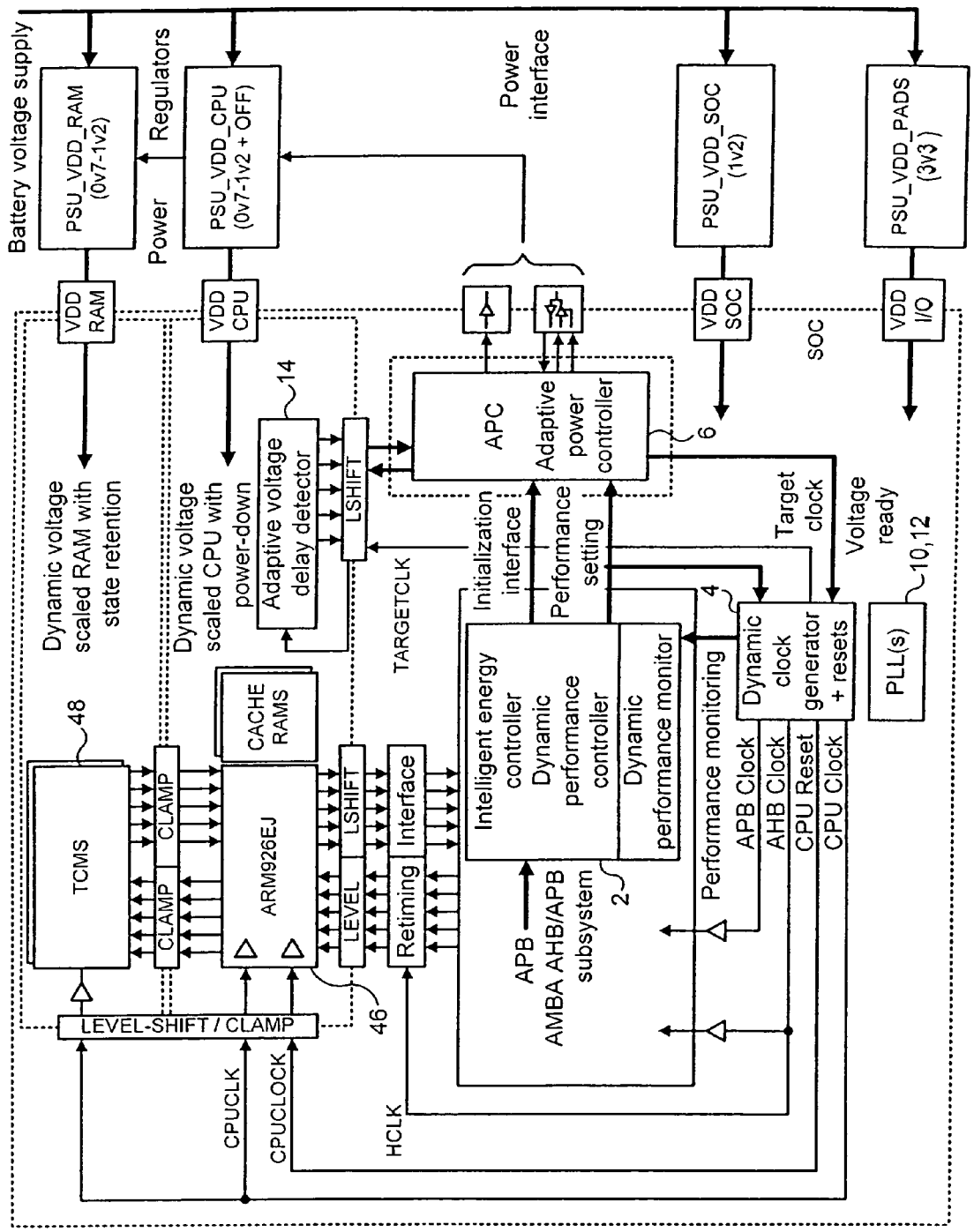
FIG. 6 is a diagram schematically illustrating another example of a data processing system utilising the current techniques.

FIG. 6 is a diagram schematically illustrating a data processing system utilising the current techniques. Like elements to those illustrated in FIG. 1 are given like reference numerals. FIG. 6 additionally illustrates the processor 46 which executes the program instructions, which may be held within a tightly coupled memory system 48 or some other memory. The different voltage domains concerned necessitate level shifters to be provided at various interfaces in the circuit as illustrated.

FIG. 7 illustrates another example mapping between desired data processing performance request level and thermometer coded control signal value. In this case a 32-bit thermometer coded control signal value is used yielding the possibility of a finer grained control of performance. It may be that the further circuits which respond to these 32-bit control signal values are in fact only capable of providing more coarsely grained control and so will effectively internally quantise the control signal values concerned. The thermometer coded control signal values provide a particularly convenient way of combining control signal values from different sources, such as from different processors on a multiprocessor system, whereby the overall performance level, which may be controllable only on a chip-wide basis, can be properly selected. A maximum control signal value can be determined by a logical OR of the control signal values, a minimum control signal value may be determined by a logical AND of the control signal value and equivalence may be determined by the XOR of the control signal values. The maximum function may be useful in determining the maximum requested clock frequency, the minimum function may be useful in indicating the minimum sustainable voltage and the equivalents function may be useful in determining a match between requirements of different elements.

Figure 8:
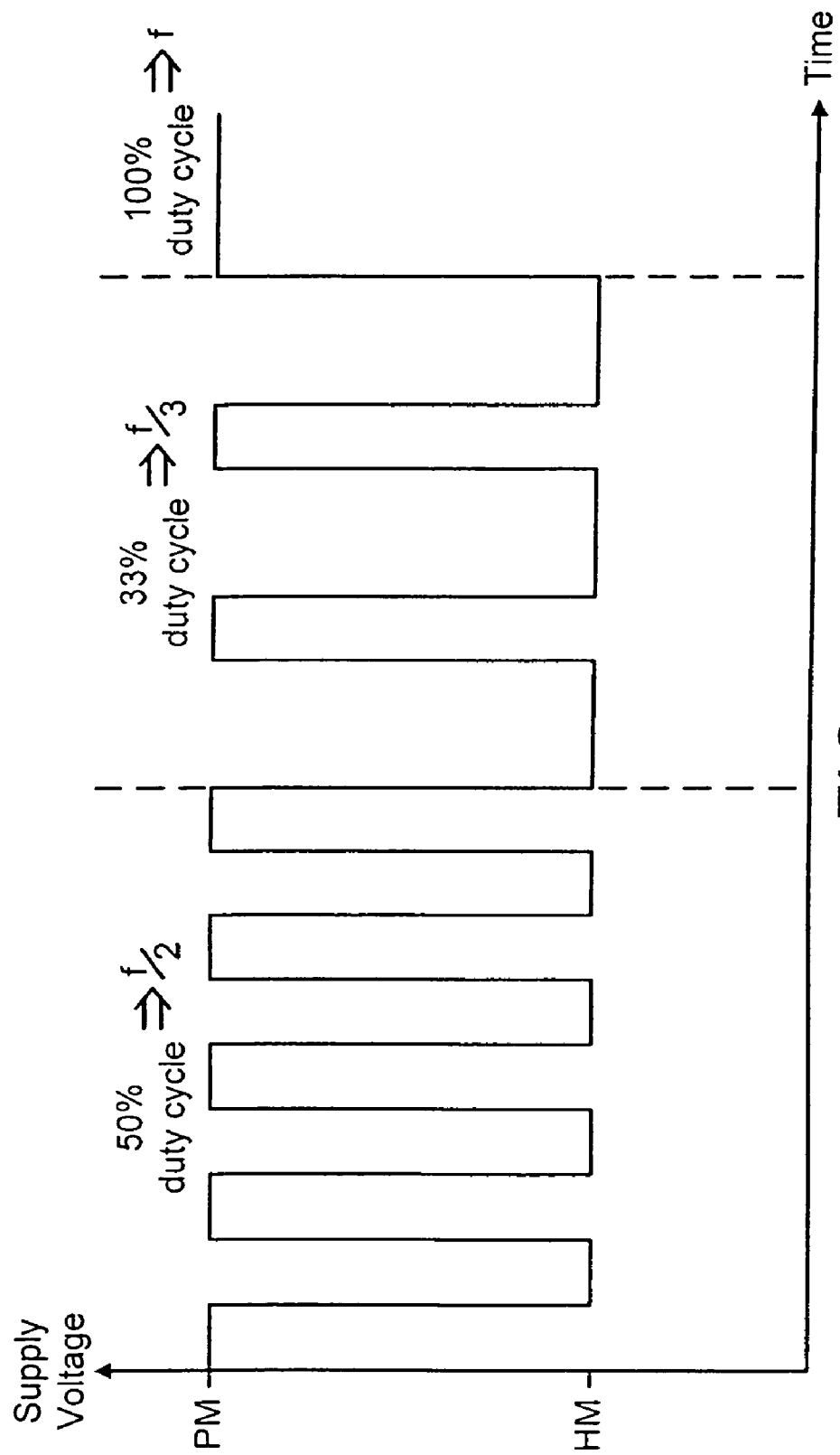
FIG. 8 illustrates the modulation of power supply voltage between a holding mode level and a processing mode level.

FIG. 8 illustrates another performance control technique. In this example the supply voltage to a processing circuit is shown as being modulated (in this example pulse width modulated) between a holding mode voltage level PM and a processing mode voltage level PM. When in the holding mode the processing circuit is not clocked and makes no progress through the code being executed. When in the processing mode, the processing circuit is clocked at its full clock signal rate and makes progress through the code being executed. The first portion of FIG. 8 illustrates the situation in which the processing circuit is in the processing mode for 50% of the time and accordingly can be considered effectively to be operating at a clock frequency of half of the supplied clock frequency. The power supply configuration, in this case the supply rail voltage (although body biasing or other techniques may be employed), is such that in the holding mode the energy consumption of the processing circuit is reduced. Thus, the processing circuit consumes less energy operating as shown since it spends half of its time in the lower energy consumption holding mode compared with being permanently in the processing mode.

In the middle portion of FIG. 8 a different modulation duty cycle ratio of 33% is used and the effective clock frequency is thus ⅓ of its maximum rate. In the final portion of FIG. 8, the system is seen to be operating 100% of its time in the processing mode and is thus effectively operating at the full fixed clock frequency rate.

Figure 9:
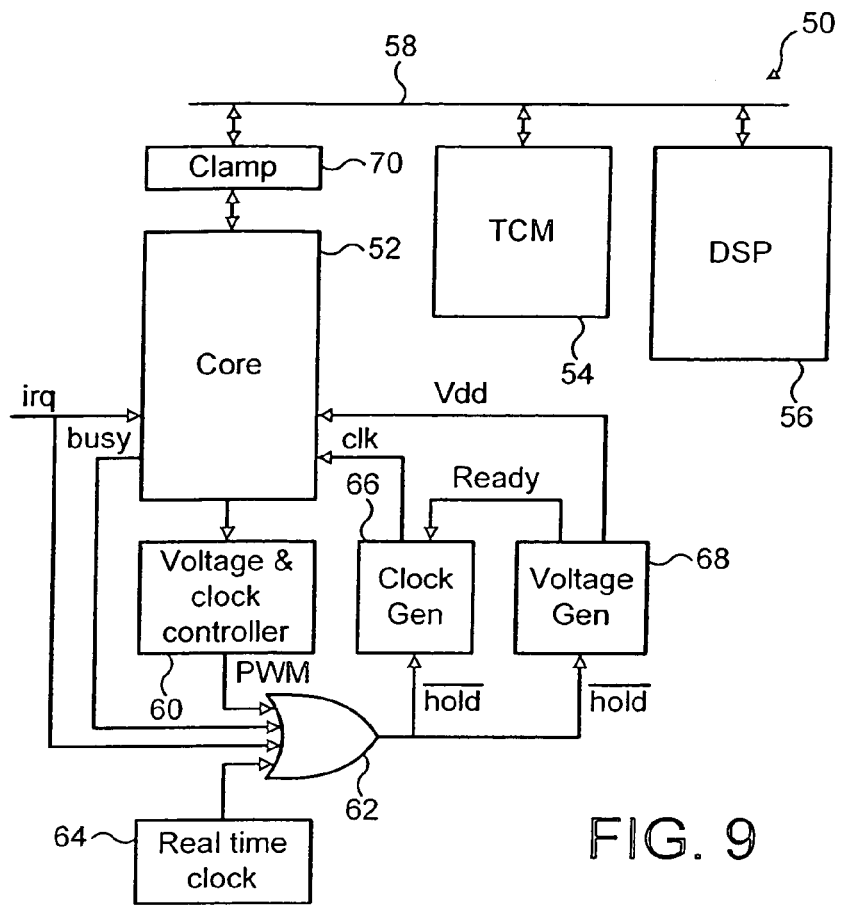
FIG. 9 schematically illustrates a circuit incorporating the technique of FIG. 8.

FIG. 9 schematically illustrates a data processing system 50 comprising a processor core 52, a tightly coupled memory 54 and a DSP circuit 56 all linked by a bus 58. The processor core 52 is subject to the above described performance control technique of FIG. 8 and is switched between a processing mode and a holding mode. A voltage and clock controller 60 receives a target performance level request from the processor core 52, possibly as generated by an operating system or other code executing on the processor core 52, and uses this to generate a pulse width modulated signal PWM selected to give an appropriate duty ratio at the fixed clock frequency to achieve the desired performance level. An OR gate 62 ORs this PWM signal with a busy signal generated by the processor core 52, an interrupt signal irq and a real-time clock request signal generated by a real-time clock circuit 64. Any of the busy signal, the interrupt signal irq and the real-time clock request signal can override the PWM signal and force the system into the processing mode when the PWM signal would otherwise place it in the holding mode.

The output of the OR gate 62 is supplied to a clock generator 66 and a voltage generator 68. When the output of the OR gate 62 indicates that the processing mode is required, then the clock generator 66 generates its clock signal clk which is supplied to the processor core 52 once the clock generator circuit 66 has received a ready signal from the voltage generator 68 indicating that the voltage generator 68 has successfully changed the power supply configuration of the processor core 52 into the processing mode configuration and this is now sufficiently stable to support clocking of the processor circuit 52. The processor core 52 generates a busy signal when it is not safe to switch the processor core 52 from the processing mode to the holding mode, e.g. when there are pending data transfers to further circuits, such as the tightly coupled memory 54 or the DSP circuit 56 via the bus 58. The processor core 52 uses active high signalling with the further circuit elements such as the tightly coupled memory 54 and the DSP circuit 56 such that clamping circuits 70 can clamp these to a ground level when the processor core 52 is placed into the holding mode or is completely powered down.

Figure 10:
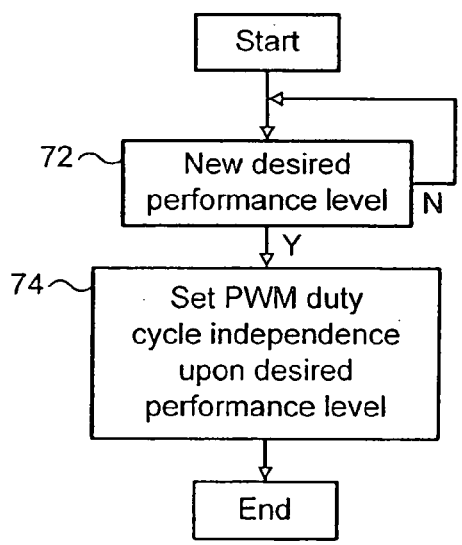
FIG. 10 is a flow diagram schematically illustrating the control of performance using a modulated voltage.

FIG. 10 schematically illustrates a flow diagram of how the performance control may be achieved by the voltage and clock controller 60. At step 72 a new desired performance level is indicated to the voltage and clock controller 60 by the processor core 52. At step 74 this desired performance level is converted into an appropriate pulse width modulation duty cycle in dependence upon a lookup in a mapping table, hardwired logic or by means. It will be appreciated that this example uses pulse width modulation, but other modulation schemes are also possible such as a scrambled sequence PWM scheme or other schemes.

Figure 11:
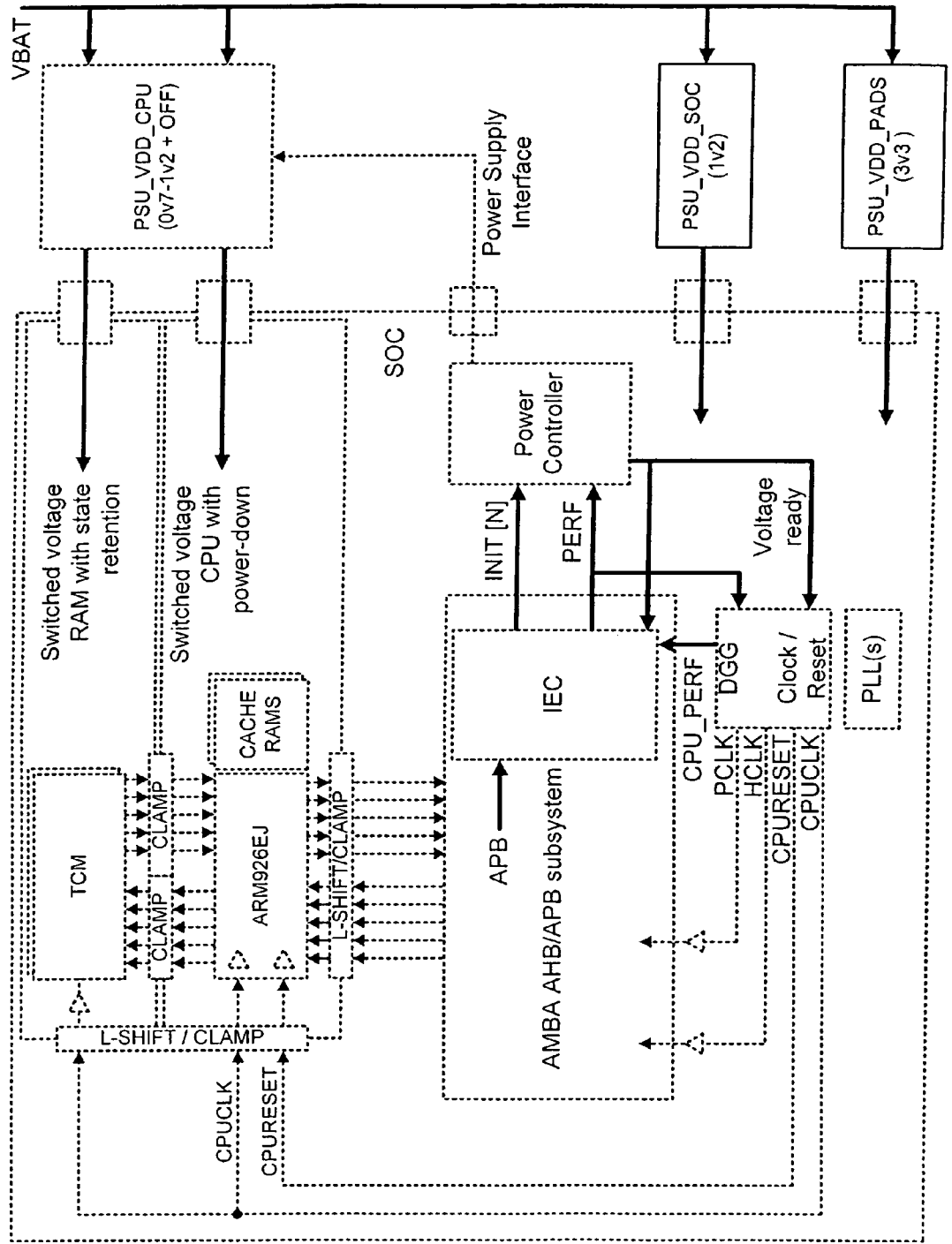
FIG. 11 is a diagram schematically illustrating another data processing system using the technique of FIG. 8.

FIG. 11 illustrates a further circuit using the technique of FIG. 8. This circuit is similar to that of FIG. 6 noting that at least some of the level shifting circuits have been replaced by clamp circuits and switched power domains are used rather than dynamic voltage scale domains.

Figure 12:
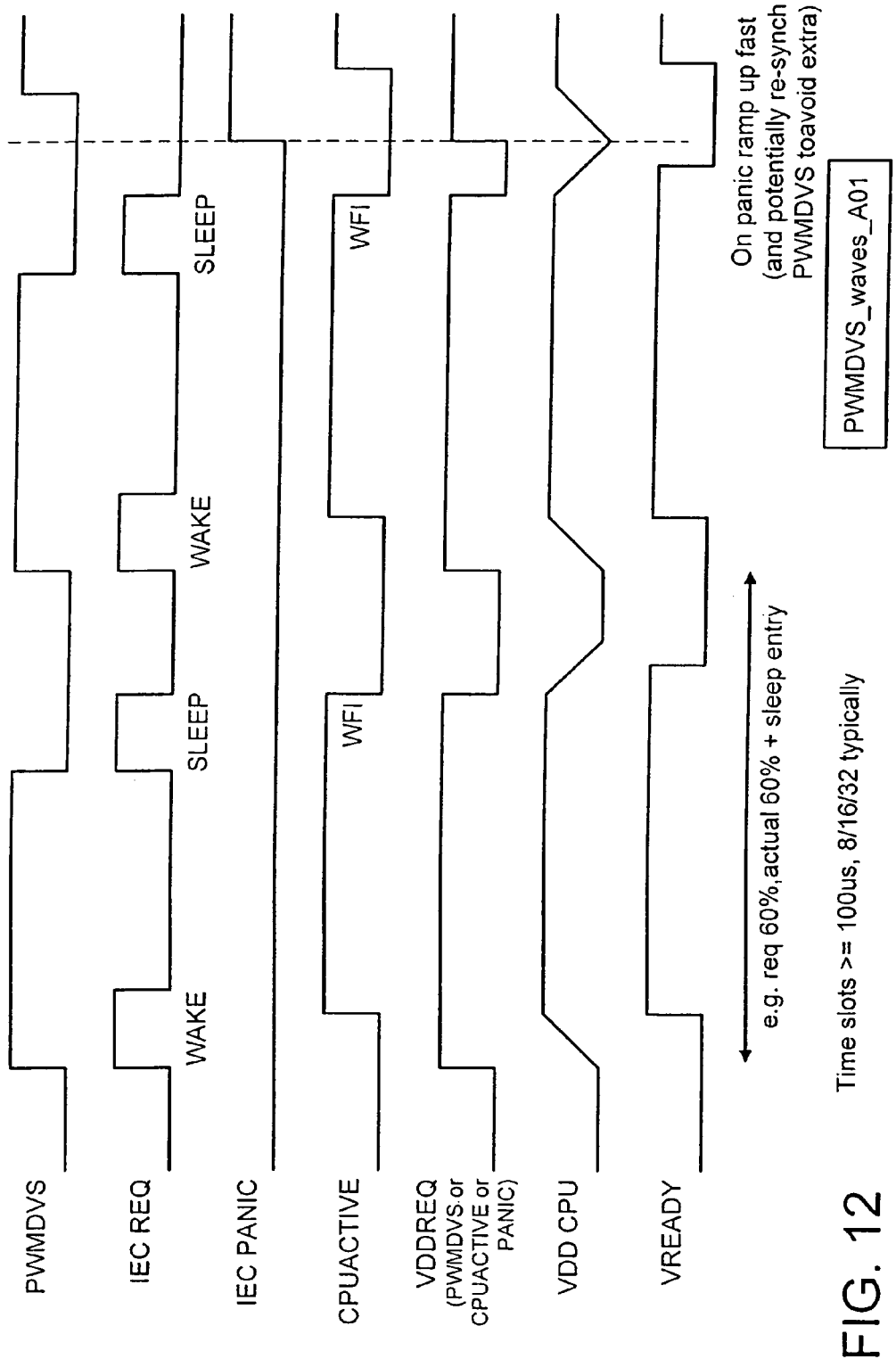
FIG. 12 is a diagram illustrating various control signals used in embodiments such as those of FIGS. 8 to 11.

FIG. 12 illustrates the PWMDVS signal produced by the voltage and clock controller 60 to command a desired performance level. The IEC REQ signal indicates successive signals being sent to a intelligent energy controller to trigger sleep and wake actions as the system moves into and out of the holding mode. The IEC PANIC signal is a priority signal for overriding the PWMDVS signal. The CPUACTIVE signal is the busy signal indicating that it is not yet safe to stop the clock to the CPU.

The VDDREQ is the output of the OR gate 62. The VDD CPU is the signal output from the voltage generator 68 and shows the finite slew rate. VREADY is the signal from the voltage generator 68 indicating to the clock generator that the clock switch can be made. It should be noted that a switch to the processing mode is not made until the slew is complete, but switching to the holding mode can take place sooner.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Apparatus for processing data, said apparatus comprising:
    a processor operable to perform data processing operations, said processor being operable to generate a performance control signal indicative of a desired data processing performance level of said processor; and
    at least one further circuit, responsive to said performance control signal, to support said desired data processing performance level of said processor; wherein while responding to a change in performance control signal corresponding to a change from a first desired data processing performance level to a second desired data processing performance level, said at least one further circuit supports data processing of said processor at at least one intermediate data processing performance level and said processor temporarily operates at said at least one intermediate data processing performance level during said change, wherein said one or more further circuits include a voltage controller operable to generate a power signal for said processor at a plurality of different voltage levels, and, in response to an increase in desired data processing performance level, said clock generator increases clock signal frequency to an intermediate clock signal frequency when said voltage controller is generating a power signal with a voltage level sufficient to support said intermediate clock signal frequency.

2. Apparatus as claimed in claim 1, wherein said one or more further circuits include a clock generator operable to generate a clock signal with a selectable clock frequency.

3. Apparatus as claimed in claim 1, wherein one or more priority signals serve to trigger said further circuit change to support a predetermined data processing performance level independently of said performance control signal.

4. A method of processing data, said method comprising the steps of:
    performing data processing operations with a processor, said processor being operable to generate a performance control signal indicative of a desired data processing performance level of said processor; and
    in response to said performance control signal, operating one or more further circuits so as to support said desired data processing performance level of said processor; wherein while responding to a change in performance control signal corresponding to a change from a first desired data processing performance level to a second desired data processing performance level, said operating step includes supporting data processing of said processor at at least one intermediate data processing performance level and said processor temporarily operates at said at least one intermediate data processing performance level during said change, wherein said one or more further circuits include a voltage controller operable to generate a power signal for said processor at a plurality of different voltage levels, and, in response to an increase in desired data processing performance level, said clock generator increases clock signal frequency to an intermediate clock signal frequency when said voltage controller is generating a power signal with a voltage level sufficient to support said intermediate clock signal frequency.

5. A method as claimed in claim 4, wherein said one or more further circuits include a clock generator operable to generate a clock signal with a selectable clock frequency.

6. A method as claimed in claims 4, wherein one or more priority signals serve to trigger said further circuit change to support a predetermined data processing performance level independently of said performance control signal.

7. Apparatus for processing data, said apparatus comprising:
    a processor operable to perform data processing operations, said processor being operable to generate a performance control signal indicative of a desired data processing performance level of said processor; and
    at least one further circuit, responsive to said performance control signal, to support said desired data processing performance level of said processor; wherein while responding to a change in performance control signal corresponding to a change from a first desired data processing performance level to a second desired data processing performance level, said at least one further circuit supports data processing of said processor at at least one intermediate data processing performance level and said processor temporarily operates at said at least one intermediate data processing performance level during said change, wherein one or more priority signals serve to trigger said further circuit change to support a predetermined data processing performance level independently of said performance control signal.

8. A method of processing data, said method comprising the steps of:
- performing data processing operations with a processor, said processor being operable to generate a performance control signal indicative of a desired data processing performance level of said processor; and
- in response to said performance control signal, operating one or more further circuits so as to support said desired data processing performance level of said processor; wherein while responding to a change in performance control signal corresponding to a change from a first desired data processing performance level to a second desired data processing performance level, said operating step includes supporting data processing of said processor at at least one intermediate data processing performance level and said processor temporarily operates at said at least one intermediate data processing performance level during said change, wherein one or more priority signals serve to trigger said further circuit change to support a predetermined data processing performance level independently of said performance control signal.

* * * * *